(12) United States Patent
Furuichi (10) Patent No.: US 10,841,804 B2
(45) Date of Patent: Nov. 17, 2020

(54) WIRELESS RESOURCE ALLOCATION DEVICE, WIRELESS RESOURCE ALLOCATION METHOD, AND RECORDING MEDIUM STORING WIRELESS RESOURCE ALLOCATION PROGRAM

(71) Applicant: NEC Corporation, Tokyo (JP)

(72) Inventor: Hideyuki Furuichi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 15/783,066

(22) Filed: Oct. 13, 2017

(65) Prior Publication Data

US 2018/0132110 A1    May 10, 2018

(30) Foreign Application Priority Data

Nov. 8, 2016   (JP) .................................. 2016-217748

(51) Int. Cl.
    *H04W 16/10*     (2009.01)
    *H04L 12/26*     (2006.01)
    (Continued)

(52) U.S. Cl.
    CPC .......... *H04W 16/10* (2013.01); *H04L 41/147* (2013.01); *H04L 43/0864* (2013.01); *H04L 43/0894* (2013.01); *H04L 47/193* (2013.01); *H04L 47/27* (2013.01); *H04L 47/70* (2013.01); *H04L 47/823* (2013.01); *H04L 47/283* (2013.01); *H04W 88/08* (2013.01)

(58) Field of Classification Search
    CPC ..... H04W 16/10; H04W 72/04; H04W 88/08; H04L 47/27; H04L 43/0894; H04L 43/0864; H04L 41/147; H04L 47/823; H04L 47/193; H04L 47/70; H04L 47/283
    See application file for complete search history.

(56) References Cited

U.S. PATENT DOCUMENTS 7,502,860 B1 *   3/2009   Champagne ............ H04L 47/10
                                                370/252
2004/0062201 A1 *  4/2004  Deshpande ............. H04L 47/10
                                                370/235
(Continued)

FOREIGN PATENT DOCUMENTS

| JP | 2008-131365 A | 6/2008 |
|---|---|---|
| JP | 2011-530235 A | 12/2011 |
| JP | 2014-509459 A | 4/2014 |

OTHER PUBLICATIONS

Japanese Office Action dated Jun. 23, 2020 in Japanese Application No. 2016-217748.

*Primary Examiner* — Ricardo H Castaneyra
(74) *Attorney, Agent, or Firm* — Sughrue Mion, PLLC (57) ABSTRACT

A wireless resource allocation device 50 includes: a prediction unit 51 that predicts a communication rate of communication information, which is transmitted and received by a wireless terminal device 60, on the base that communication-rate-control-information which is included in the communication information and which is determined by a communication protocol regularly changes; and an allocation unit 52 that allocates wireless resources, which are used for communication with the wireless terminal device 60, on the base of the communication rate predicted by the prediction unit 51.

9 Claims, 10 Drawing Sheets

(51) Int. Cl.
*H04L 12/24* (2006.01)
*H04L 12/911* (2013.01)
*H04L 12/801* (2013.01)
*H04L 12/807* (2013.01)
H04L 12/841 (2013.01)
H04W 88/08 (2009.01)

(56) References Cited

U.S. PATENT DOCUMENTS

| | | |
|---|---|---|
| 2010/0029282 A1 | 2/2010 | Stamoulis et al. |
| 2010/0246398 A1* | 9/2010 | Chiang ............... H04L 43/0829 370/235 |
| 2012/0201159 A1 | 8/2012 | Morita et al. |
| 2016/0094470 A1* | 3/2016 | Skog ................. H04W 28/0205 370/230 |

* cited by examiner

WIRELESS RESOURCE ALLOCATION DEVICE, WIRELESS RESOURCE ALLOCATION METHOD, AND RECORDING MEDIUM STORING WIRELESS RESOURCE ALLOCATION PROGRAM

This application is based upon and claims the benefit of priority from Japanese Patent Application No. 2016-217748, filed on Nov. 8, 2016, the disclosure of which is incorporated herein in its entirety by reference.

TECHNICAL FIELD

The present invention relates to an art to allocate wireless resources which a base station for wireless communication or the like uses for communication with a wireless terminal device.

BACKGROUND ART

A base station, which carries out wireless communication connection control to a wireless terminal device such as a smartphone, a tablet terminal, or the like, allocates wireless resources (bandwidth) which are used for wireless communication with each wireless terminal device. Recently, by rapid prevalence of the smartphone and the tablet terminal, data traffic of the wireless communication increases rapidly, and then it is strongly expected to realize an art for the base station's allocating the wireless resources efficiently.

As an art related to the above-mentioned art, a patent literature (PTL) 1 (Japanese Patent Application Laid-Open Publication No. 2008-131365) discloses a band allocation method applied to a base station of a wireless communication system in which a plurality of terminals share a wireless connection and communicate through the wireless connection. According to the band allocation method, an amount of data, which are transmitted by each of the terminals, is measured for each of the terminals, and then an amount of data and its occurrence probability are calculated based on the latest N times (N is an integer larger than 1) measurement results on a terminal which is a band allocation target. According to the band allocation method, a plurality of allocation candidate bands are set in advance, and on the base of a total amount of bands which, when applying the amount of data, the occurrence probability, and each allocation candidate band, is required until transmission is completed, an expectation value of throughput is calculated for each of the allocation candidate bands. Then, according to the band allocation method, the allocation candidate band which has the maximum expectation value of throughput among the calculated expectation values is determined as allocation information which indicates that the terminal of the band allocation target will use at a next period.

Moreover, PTL 2 (Japanese Patent Application Laid-Open Publication (Translation of PCT Application) No. 2011-530235) discloses a dynamic resource division method in wireless communication. According to the method, a performance metric for an access point in a wireless network is acquired, and an input to a network utility model is updated by the performance metric. Then, according to the method, resource division is selected for the access point which optimizes network utility of the model.

Moreover, PTL 3 (Japanese Patent Application Laid-Open Publication (Translation of PCT Application) No. 2014-509459) discloses a base station that determines wireless resources, which are allocated downlink communication, out of wireless resource area commonly used by another base station. When it is estimated that, in comparison with a case of using a whole of the wireless resource area which is commonly used by the another base station, a case of using a restricted first wireless resource segment, which is a part of the wireless resource area, makes communication quality of the downlink communication improved, the base station restricts the wireless resources to the first radio resource segment. The base station detects that the another base station carries out resource division of restricting wireless resources, which are used for downlink communication between the another base station and a mobile station, to a second wireless resource segment.

SUMMARY

In some cases, a communication protocol for controlling wireless communication includes information (communication-rate-control-information) which controls a communication rate. For example, communication data, which are transmitted and received based on TCP (Transmission Control Protocol), include a window size as header information. According to TCP, in order to ensure reliability of communication, response confirmation (transmission of ACK (acknowledgement) packet) in response to packet transmission is carried out. But, if the response confirmation is carried out every time the packet is transmitted, there is a problem that the communication rate decreases. According to TCP, in order to avoid the problem, the window size, which indicates an amount of data able to be transmitted once without waiting the ACK packet, is defined. The window size is dynamically and regularly changed according to predetermined algorithm by a device which communicates based on TCP.

The communication rate of the wireless communication is affected by the communication-rate-control-information such as the window size or the like. Any one of the PTLs 1 to 3 does not disclose an art to allocate the wireless resources by predicting the communication rate of the wireless communication on the base of the above-mentioned communication-rate-control-information. One of objects of the present invention is to provide a wireless resource allocation device and the like which realize the above-mentioned art.

Means to Solve the Problem

A wireless resource allocation device according to an aspect of the present invention includes: a prediction unit configured to predict a communication rate of communication information, which is transmitted and received by a wireless terminal device, on the base that communication-rate-control-information which is included in the communication information and which is determined by a communication protocol regularly changes; and an allocation unit configured to allocate wireless resources, which are used for communication with the wireless terminal device, on the base of the communication rate predicted by the prediction unit.

In another view point to achieve the above-mentioned object, a wireless resource allocation method according to an aspect of the present invention makes an information processing device: predict a communication rate of communication information, which is transmitted and received by a wireless terminal device, on the base that communication-rate-control-information which is included in the communication information and which is determined by a communication protocol regularly changes; and allocate wireless resources, which are used for communication with the wireless terminal device, on the base of the predicted communication rate.

In further another view point to achieve the above object, a wireless resource allocation program according to an aspect of the present invention is a program which makes a computer execute; a prediction processing to predict a communication rate of communication information, which is transmitted and received by a wireless terminal device, on the base that communication-rate-control-information which is included in the communication information and which is determined by a communication protocol regularly changes; and an allocation processing to allocate wireless resources, which are used for communication with the wireless terminal device, on the base of the communication rate predicted in the prediction processing.

Furthermore, the present invention can be realized also by a non-volatile and computer readable recording medium which stores the wireless resource allocation program (computer program).

The present invention makes it possible to improve efficiency in allocating the wireless resources.

EXAMPLE EMBODIMENT

Hereinafter, an example embodiment of the present invention will be explained in detail with reference to drawings. The present invention is an invention which focuses on a phenomenon that communication information used for controlling communication rate (to be referred to communication-rate-control-information herein after) such as the window size is regularly changed with control carried out by a communication protocol. Thereby, the present invention realizes improvement of efficiency in allocation of wireless resources by predicting a communication rate with higher level accuracy and allocating the wireless resources on the base of the predicted communication rate.

First Example Embodiment

Figure 1:
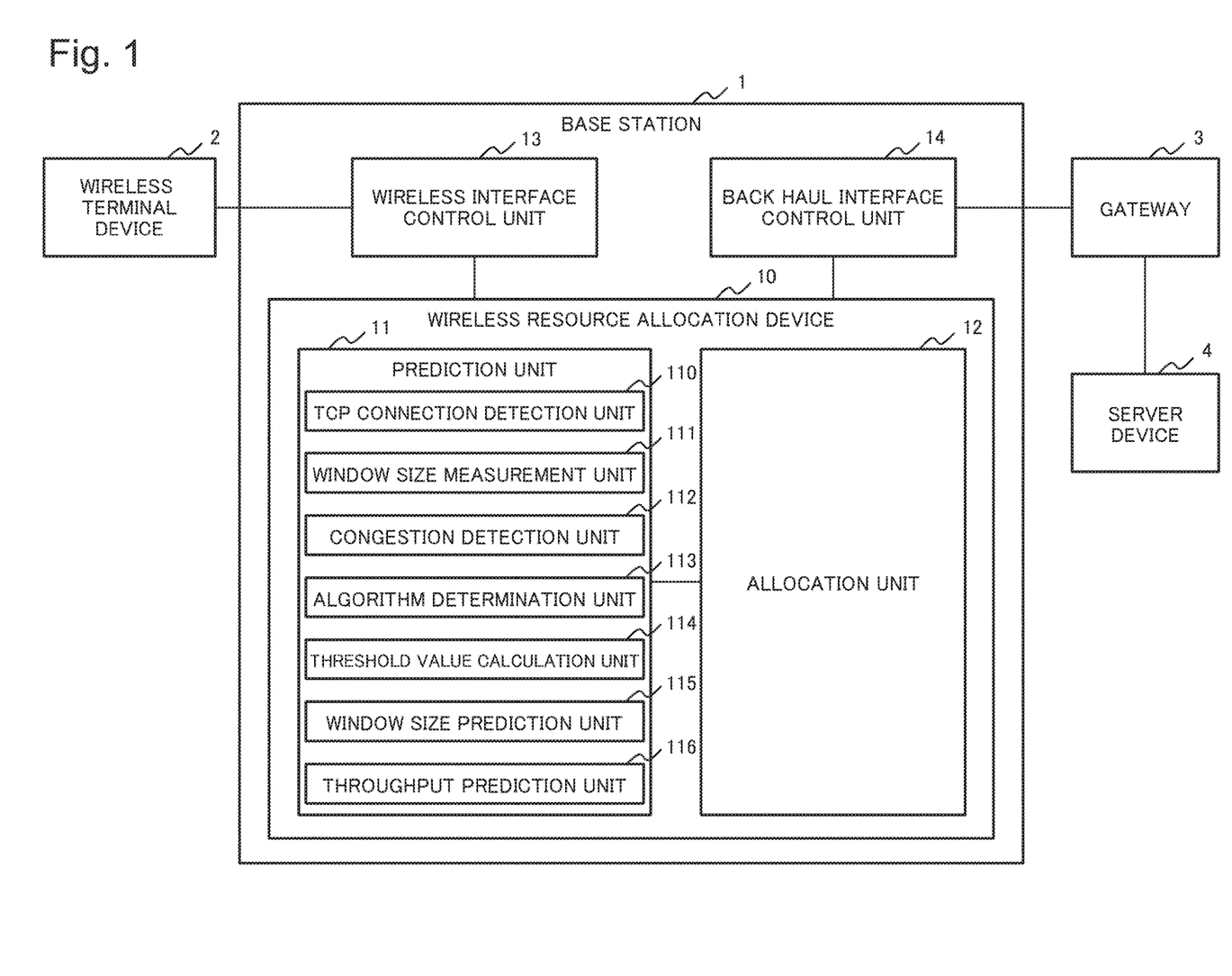
FIG. 1 is a block diagram illustrating a configuration of a wireless resource allocation device 10 according to a first example embodiment of the present invention.

FIG. 1 is a block diagram conceptually illustrating a configuration of a wireless resource allocation device 10 according to a first example embodiment of the present invention. The wireless resource allocation device 10 is included by a base station 1 which controls a connection of wireless communication with a wireless terminal device 2. The wireless resource allocation device 10 may be another device which is communicably connected with the base station 1.

The base station 1 includes the wireless resource allocation device 10, a wireless interface control unit 13, and a back haul interface control unit 14. The wireless interface control unit 13 controls transmission and reception of communication data (communication information) which are carried out between the wireless terminal device 2 and the base station 1. The back haul interface control unit 14 controls transmission and reception of communication data which are carried out between the base station 1 and a gateway 3 connected with a server device 4 which is a final object of communication of the wireless terminal device 2 through the base station 1 and the gateway 3.

Figure 2:
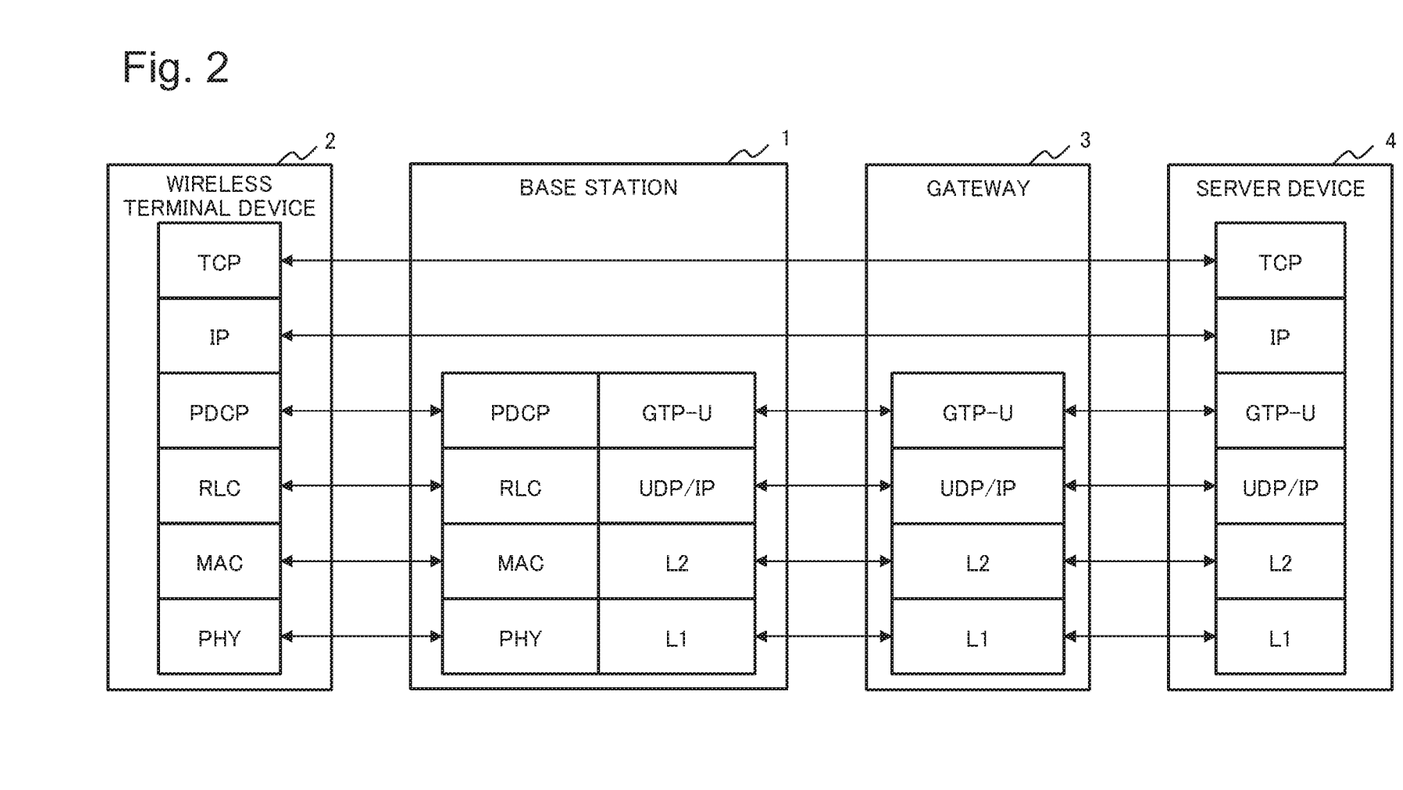
FIG. 2 is a diagram exemplifying a protocol stack of communication between a wireless terminal device 2 and a server device 4 according to the first example embodiment of the present invention.

FIG. 2 is a diagram exemplifying a protocol stack (layer of protocol) of the communication which is carried out between the wireless terminal device 2 and the server device 4 through the base station 1 and the gateway 3. For example, TCP is a protocol to control transferring the communication data between the wireless terminal device 2 and the server device 4 by using IP (Internet Protocol). IP is a protocol which controls transferring the communication data between the wireless terminal device 2 and the base station 1 by using PDCP, and controls transferring the communication data between the base station 1 and the server device 4 through the gateway 3 by using GTP-U, where PDCP is an abbreviation of "Packet Data Convergence Protocol", and GTP-U is an abbreviation of "GPRS Tunneling Protocol for User Plane (GPRS is an abbreviation of "General Packet Radio Service)". Here, since the protocol stack illustrated in FIG. 2 is well-known, detailed explanation on the protocol stack is omitted.

The wireless resource allocation device 10 illustrated in FIG. 1 is a device which predicts a communication rate on the base of information which is included by the communication data transmitted and received between the wireless terminal device 2 and the server device 4, and allocates wireless resources (bandwidth), which are used for communication of the base station 1 with the wireless terminal device 2, on the base of the prediction result. The wireless resource allocation device 10 includes a prediction unit 11 and an allocation unit 12.

The prediction unit 11 includes a TCP connection detection unit 110, a window size measurement unit 111, a congestion detection unit 112, an algorithm determination unit 113, a threshold level calculation unit 114, a window size prediction unit 115, and a throughput prediction unit 116.

The TCP connection detection unit 110 detects that a TCP connection is established by the 3-way handshake having been carried out between the wireless terminal device 2 and the server device 4. That is, when the wireless terminal device 2 and the server device 4 start TCP communication, the TCP connection detection unit 110 detects a SYN (Synchronize) packet which the wireless terminal device 2 transmits to the server device 4, a SYN+ACK packet (reply packet to SYN) which the server device 4 transmits to the wireless terminal device 2, and an ACK packet which the wireless terminal device 2 transmits to the server device 4. Moreover, by detecting that a FIN (Finish) packet, a FIN+ACK packet (reply packet to FIN), and an ACK packet, the TCP connection detection unit 110 detects that the TCP connection between the wireless terminal device 2 and the server device 4 is released.

The window size measurement unit 111 measures a window size of the TCP connection between the wireless terminal device 2 and the server device 4, where the TCP connection is detected by the TCP connection detection unit 110. The window size is embedded in a packet (segment) as header information, and is dynamically and regularly changed according to predetermined algorithm by the wireless terminal device 2 and the server device 4.

The congestion detection unit 112 monitors a state of communication between the wireless terminal device 2 and the server device 4, and detects a congestion of the communication state which occurs in both devices. The congestion detection unit 112 includes a device (not illustrated in the drawing) which has a timer function such as a clock, a counter, or the like. The congestion detection unit 112 measures a both-way delay time RTT (Round Trip Time) from a time when the wireless terminal device 2 transmits a transmission packet to the server device 4 up to a time when the wireless terminal device 2 receives a reply packet, which is a reply to the transmission packet, from the server device 4. Then, the congestion detection unit 112 detects that the congestion occurs when a situation of receiving the reply packet satisfies a predetermined condition, for example, like RTT is equal to or larger than a criterion value.

Figure 3:
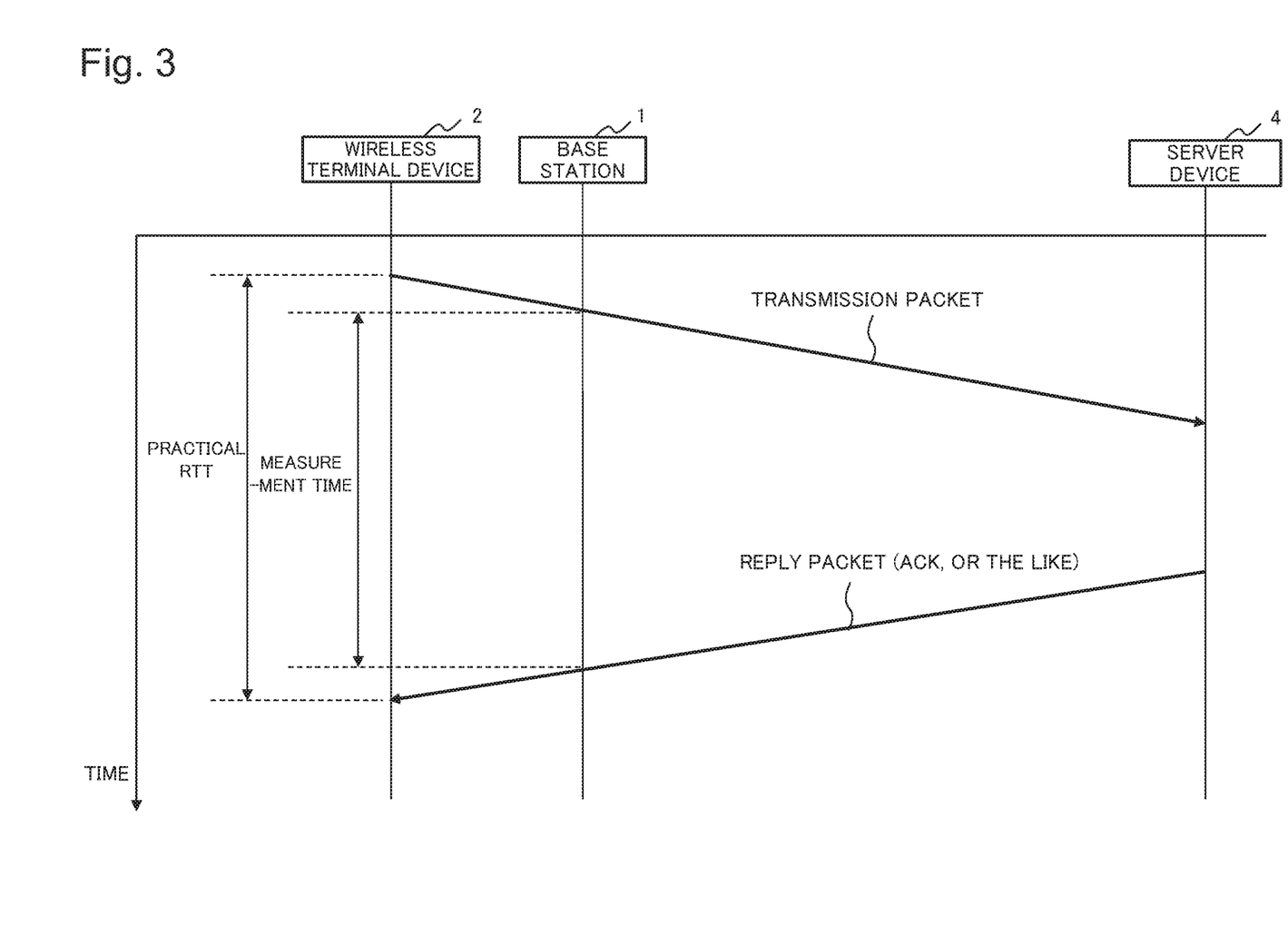
FIG. 3 is a diagram exemplifying a method for measurement of RTT which is carried out by a prediction unit 11 according to the first example embodiment of the present invention.

FIG. 3 is a diagram exemplifying a method for measurement of RTT which is carried out by the congestion detection unit 112 according to the present example embodiment. A measurement time, which is measured by the congestion detection unit 112, is a delay time from a time when the base station 1 receives the transmission packet from the wireless terminal device 2 up to a time when the base station 1 receives the reply packet, which is the reply to the transmission packet, from the server device 4. The reply packet is, for example, ACK to the transmission packet, SYN+ACK to SYN, or the like. Alternatively, the reply packet may be a packet which replies to a transmission packet representing ACK to a series of segments and which represents a first segment starting next.

As illustrated in FIG. 3, there are some errors between the measurement value of RTT which is measured by the congestion detection unit 112, and practical RTT, but it is possible to ignore the errors. Alternatively, in consideration that there are some errors, the congestion detection unit 112 may output a value, which is acquired by adding a predetermined value to the measurement value of RTT, as the practical RTT. The added predetermined-value in this case is, for example, a value based on a transmission delay time between the base station 1 and the wireless terminal device 2. The transmission delay time may be, for example, an average of plural measurement values each of which is based on the delay time between the base station 1 and the wireless terminal device 2 and each of which is measured in advance.

At a necessary time, the algorithm determination unit 113 illustrated in FIG. 1 determines a classification of the algorithm, with which the wireless terminal device 2 and the server device 4 dynamically change the window size, on the base of a measurement result provided by the window size measurement unit 111. It is assumed that the algorithm determination unit 113 has a criterion which are necessary to determine the classification of the algorithm. For example, when the congestion occurs in the TCP communication, the wireless terminal device 2 and the server device 4 dynamically change the window size by using various pieces of congestion control algorithm in order to avoid the congestion.

Figure 4:
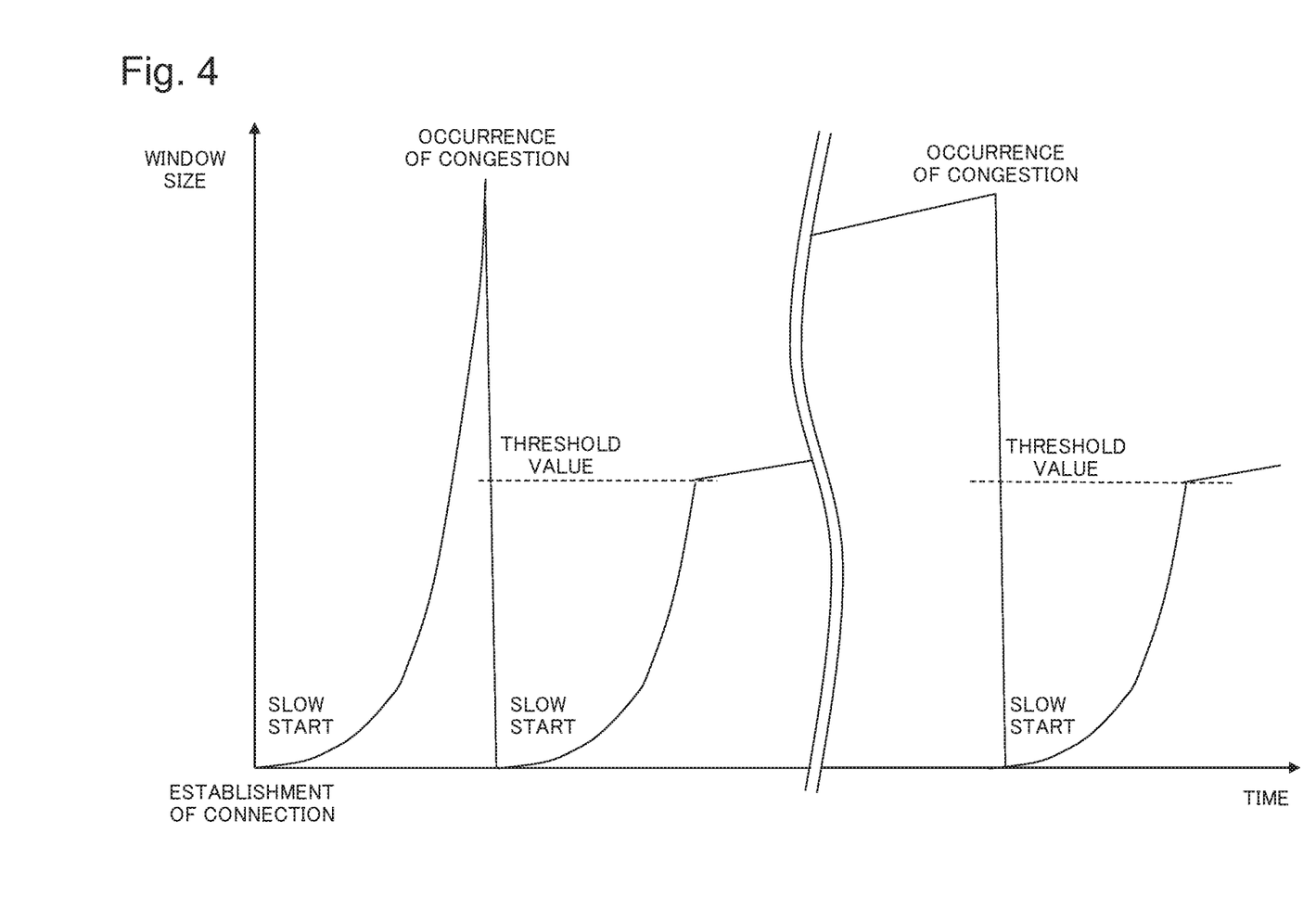
FIG. 4 is a diagram exemplifying a temporal transition of a window size which is observed when using the TCP Tahoe algorithm as congestion control algorithm.

FIG. 4 is a diagram exemplifying a temporal transition of the window size which is observed when using the TCP Tahoe algorithm as the congestion control algorithm. According to the TCP Tahoe algorithm, after a TCP connection is established, the window size is set, for example, to one segment (one unit amount). According to the TCP Tahoe algorithm, before the congestion occurs, the window size is made, for example, double every time the communication is carried out. Therefore, the window size increases exponentially. The above-mentioned operation of controlling the window size is generally called the "slow start".

When the communication rate exceeds a permissible limit of a communication network due to the above-mentioned increase of the window size, the congestion occurs. According to the TCP Tahoe algorithm, a threshold value is determined, for example, to be a half of the window size which has been set when the congestion occurs, and afterward the window size is reset, for example, to be the one segment. Then, according to the TCP Tahoe algorithm, until the window size reaches the threshold value, the window size is doubled every time the communication is carried out. According to the TCP Tahoe algorithm, after the window size reaches the threshold value, the window size is increased by one segment.

According to the TCP Tahoe algorithm, when the congestion occurs again, an operation, which is the same as the operation carried out when the first congestion occurs, is carried out. That is, the threshold value is determined to be a half of the window size which has been set when the congestion occurs again, and afterward the window size is reset to be the one segment. Then, according to the TCP Tahoe algorithm, the window size is controlled with the slow start.

Figure 5:
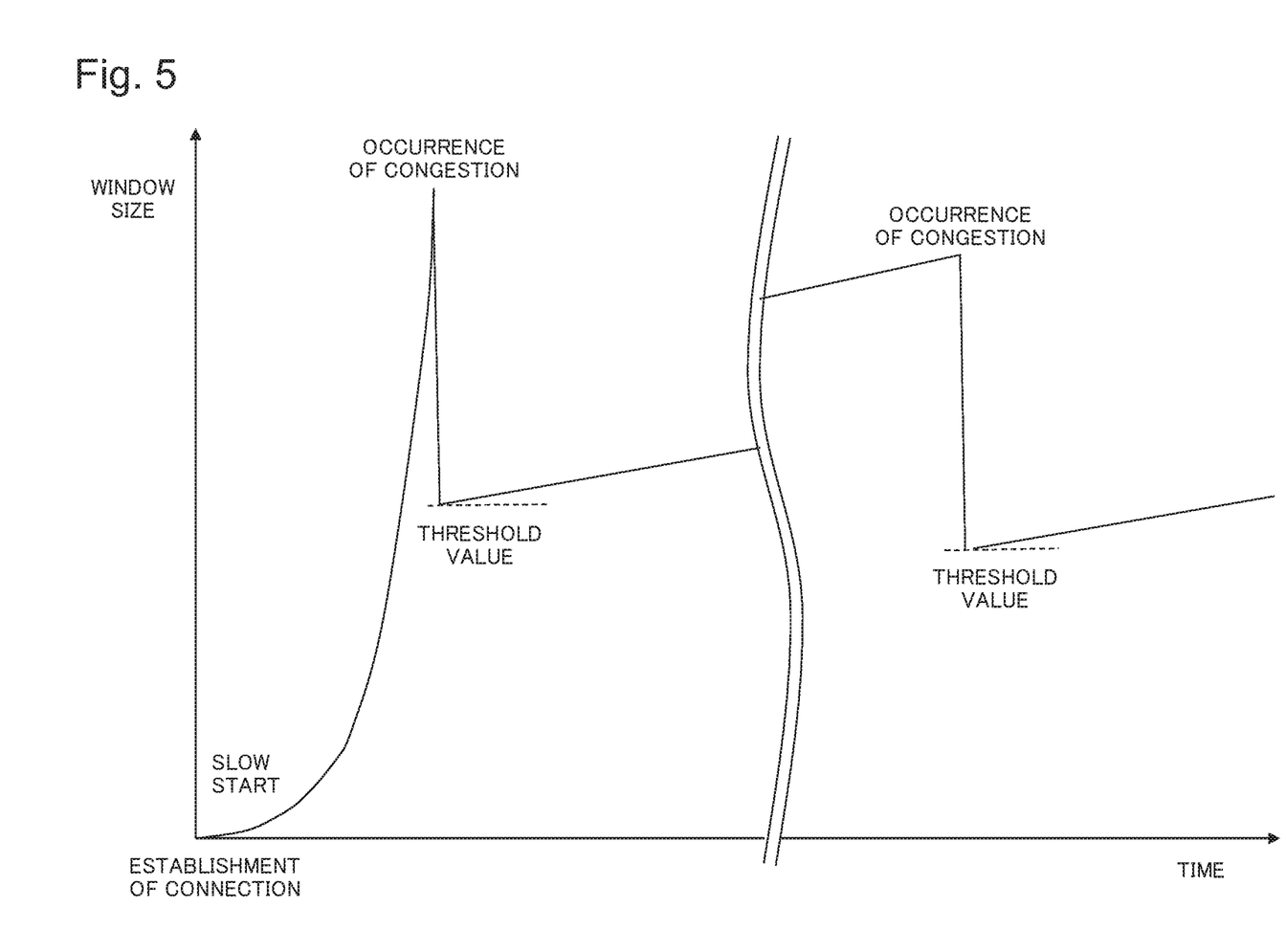
FIG. 5 is a diagram exemplifying a temporal transition of the window size which is observed when using the TCP Reno algorithm as the congestion control algorithm.

FIG. 5 is a diagram exemplifying a temporal transition of the window size which is observed when using the TCP Reno algorithm as the congestion control algorithm. According to the TCP Tahoe algorithm illustrated in FIG. 4, when the congestion occurs, the window size is set to be the one segment, and afterward the window size is controlled with the slow start. In contrast, according to the TCP Reno algorithm, when the congestion occurs, the window size is set to be the threshold value (a half of the window size which has been set when the congestion occurs). Afterward, according to the TCP Reno algorithm, until the congestion occurs again, the window size is increased, for example, by one segment.

According to the TCP Reno algorithm, when the congestion occurs again, an operation, which is the same as the operation carried out when the first congestion occurs, is carried out. That is, the threshold value is determined to be a half of the window size which has been set when the congestion occurs again, and afterward the window size is set, for example, to be the threshold value. Then, according to the TCP Reno algorithm, the window size is controlled so as to be increased by one segment.

The TCP Tahoe algorithm which is exemplified in FIG. 4, and the TCP Reno algorithm which is exemplified in FIG. 5 are generally called the "loss base method".

Figure 6:
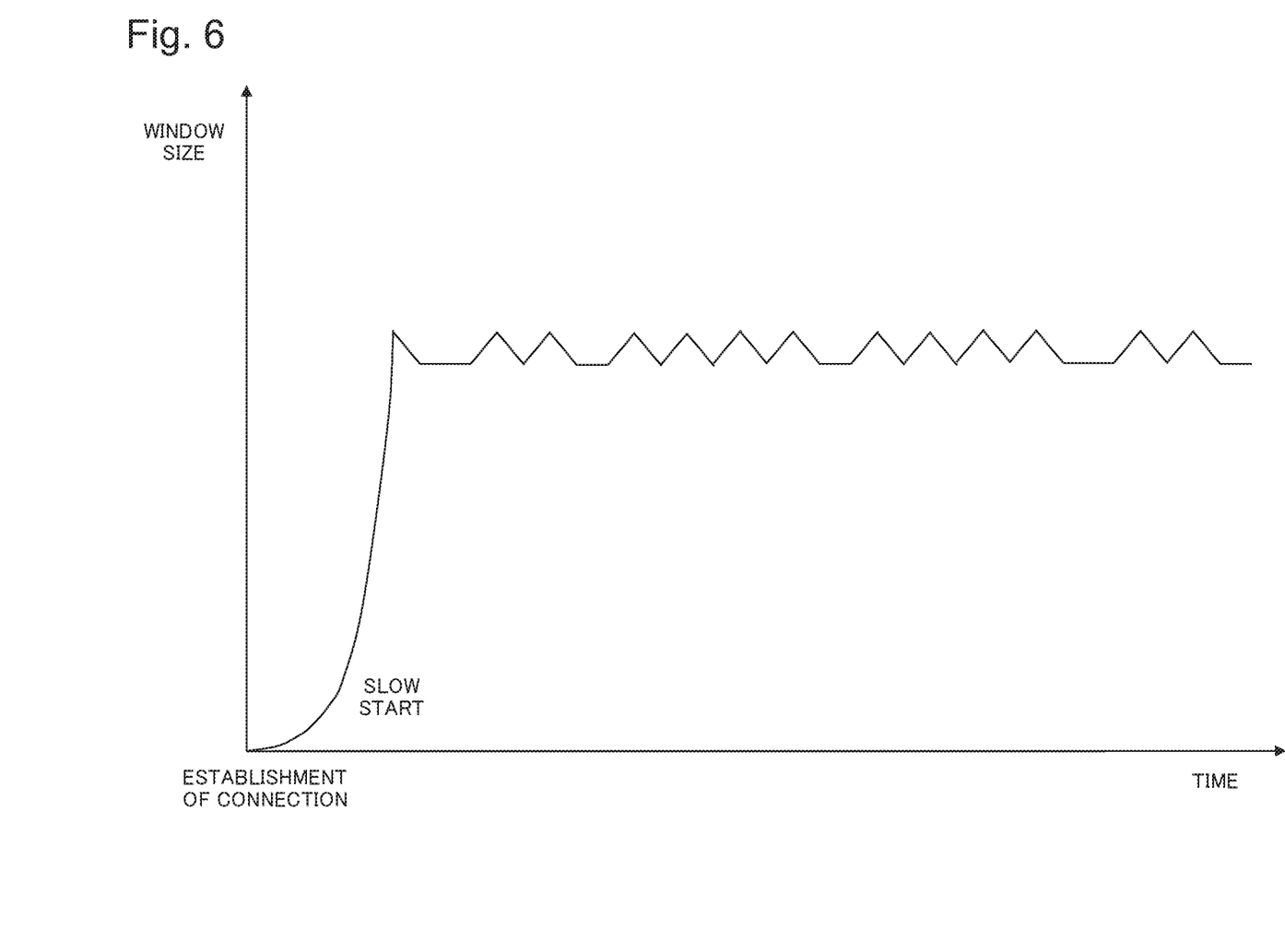
FIG. 6 is a diagram exemplifying a temporal transition of the window size which is observed when using the TCP Vegas algorithm as the congestion control algorithm.

FIG. 6 is a diagram exemplifying a temporal transition of the window size which is observed when using the TCP Vegas algorithm as the congestion control algorithm. According to the TCP Vegas algorithm, RTT is measured, and RTT is also estimated. According to the TCP Vegas algorithm, since it is possible to regard the congestion as starting occurring in the communication network when the measurement value of RTT becomes sufficiently larger than the estimation value of RTT (a difference between the measurement value and the estimation value becomes larger than a predetermined criterion value), the window size is decreased by one segment. According to the TCP Vegas algorithm, since it is possible to regard the communication network as having a margin in a communicable amount of data when the measurement value of RTT becomes sufficiently smaller than the estimation value of RTT (a difference between the measurement value and the estimation value becomes smaller than the predetermined criterion value), the window size is increased by one segment. According to the TCP Vegas algorithm, when the measurement value of RTT and the estimation value of RTT are almost equal, the window size is kept as it is.

The TCP Vegas algorithm illustrated in FIG. 6 is generally called the "delay base method".

Each of the above-mentioned three kinds of the TCP congestion control algorithm is a mere example. As the TCP congestion control algorithm, there is, for example, a hybrid method which has both of the loss base method and the delay base method and which can switch between the control methods according to a situation of the communication network, or the like.

The threshold value calculation unit 114 calculates the threshold value which, for example, the TCP Tahoe algorithm, the TCP Reno algorithm, or the like determines. When the congestion detection unit 112 detects the congestion, the threshold value calculation unit 114 calculates that the threshold value is, for example, a half of the window size which is measured by the window size measurement unit 111.

The window size prediction unit 115 predicts the window size of the communication between the wireless terminal device 2 and the server device 4 on the base of the measurement result provided by the window size measurement unit 111, the detection result provided by the congestion detection unit 112, the determination result provided by the algorithm determination unit 113, and the calculation result provided by the threshold value calculation unit 114.

Next, an operation, which is carried out by the window size prediction unit 115 when the determination result provided by the algorithm determination unit 113 indicates that the algorithm is the TCP Tahoe algorithm exemplified in FIG. 4, will be explained. In this case, the window size prediction unit 115 predicts that the window size exponentially increases with the slow start after the TCP connection detection unit 110 detects establishment of the TCP connection. That is, for example, on the base of prediction that the window size starts from one segment and increases double every time the communication is carried out, the window size prediction unit 115 predicts the window size of next communication from the measurement result provided by the window size measurement unit 111.

When the congestion detection unit 112 detects the congestion, the window size prediction unit 115 predicts that the window size of the next communication is one segment. Afterward, when the measurement result provided by the window size measurement unit 111 is smaller than the threshold value calculated by the threshold value calculation unit 114, the window size prediction unit 115 predicts that the window size of the next communication is, for example, two times as large as the measurement result provided by the window size measurement unit 111. On the other hand, when the measurement result provided by the window size measurement unit 111 is equal to or larger than the threshold value calculated by the threshold value calculation unit 114, the window size prediction unit 115 predicts that the window size of the next communication is a value, which is acquired by adding 1 to the measurement result provided by the window size measurement unit 111, until the congestion detection unit 112 detects the congestion again. As mentioned above, the window size prediction unit 115 predicts the window size according to the TCP Tahoe algorithm.

Next, an operation, which is carried out by the window size prediction unit 115 when the determination result provided by the algorithm determination unit 113 indicates that the algorithm is the TCP Reno algorithm exemplified in FIG. 5, will be explained. In this case, at a period from a time when the TCP connection detection unit 110 detects establishment of the TCP connection up to a time when the congestion detection unit 112 detects the congestion, the window size prediction unit 115 predicts the window size in a way which is the same as the way carried out when the algorithm is the TCP Tahoe algorithm.

When the congestion detection unit 112 detects the congestion, the window size prediction unit 115 predicts that the window size of the next communication is the threshold value which is calculated by the threshold value calculation unit 114. Afterward, until the congestion detection unit 112 detects the congestion again, the window size prediction unit 115 predicts that the window size of the next communication is a value, which is acquired by adding 1 to the measurement result provided by the window size measurement unit 111. As mentioned above, the window size prediction unit 115 predicts the window size according to the TCP Reno algorithm.

When the determination result provided by the algorithm determination unit 113 indicates that the algorithm is the TCP Vegas algorithm which is exemplified in FIG. 6, the window size prediction unit 115 similarly predicts the window size according to the TCP Vegas algorithm.

The throughput prediction unit 116 illustrated in FIG. 1 predicts a throughput (communication rate) of the communication between the wireless terminal device 2 and the server device 4 by using the following mathematical formula 1 based on the window size predicted by the window size prediction unit 115, and RTT measured by the congestion detection unit 112.

Throughput (bps)=MSS (byte)×Window size×8/RTT (second)     (mathematical formula 1), where, bps is an abbreviation of "bit per second", and MSS is a maximum segment size (Maximum Segment Size), and "×" is an operator which represents the multiplication, and "/" is an operator which represents the division.

A value of MSS in the mathematical formula 1 is embedded in the SYN packet or the SYN+ACN packet, and is extracted by the TCP connection detection unit 110. Alternatively, the value of MSS may be given as an arbitrary value from the outside. For example, in the case of communication according to Ethernet (registered trademark), MSS is 1460 bytes. In the case of Ethernet which can transmit segment data of maximum 1500 bytes, the value of MSS is found by subtracting 40 bytes, which is a header size of IP and TCP, from 1,500 bytes.

When calculating the throughput by using the mathematical formula 1, the throughput prediction unit 116 may use a predetermined initial value (for example, 3 seconds) as RTT, and replace the initial value with a value of RTT which is measured by the congestion detection unit 112.

On the base of the throughput predicted by the prediction unit 11, the allocation unit 12 illustrated in FIG. 1 allocates the wireless resources (bandwidth), which are used for the communication of the base station 1 with the wireless terminal device 2, so as to be able to realize the throughput.

Next, an operation (processing) of the wireless resource allocation device 10 according to the present example embodiment will be explained in detail with reference to flowcharts illustrated in FIG. 7 and FIG. 8.

Figure 7:
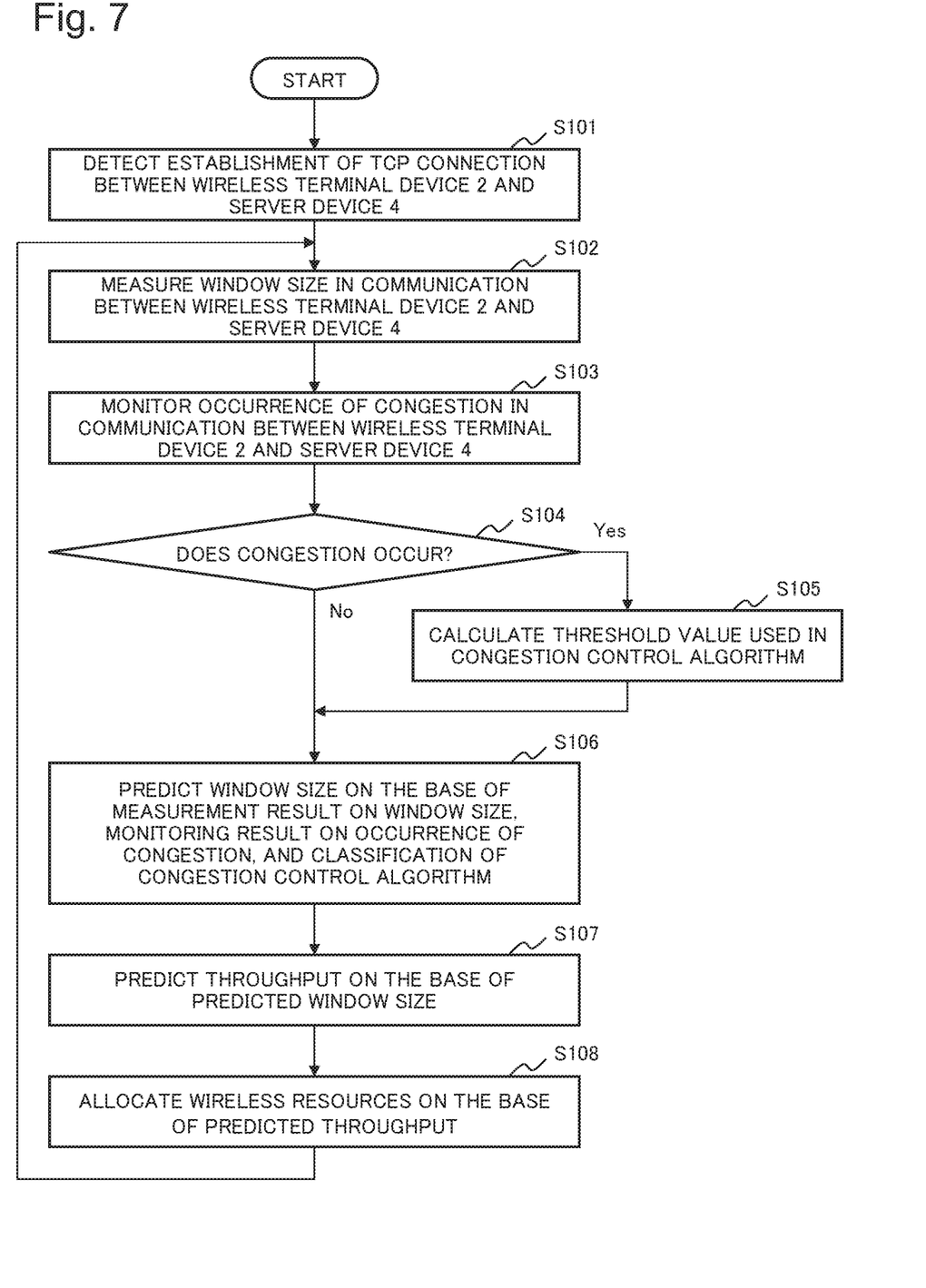
FIG. 7 is a flowchart illustrating an operation in which the wireless resource allocation device 10 according to the first example embodiment of the present invention allocates wireless resources.

FIG. 7 is the flowchart illustrating an operation in which the wireless resource allocation device 10 allocates the wireless resources necessary for communication with the wireless terminal device 2.

The TCP connection detection unit 110 of the prediction unit 11 detects establishment of the TCP connection between the wireless terminal device 2 and the server device 4 (Step S101). The window size measurement unit 111 of the prediction unit 11 measures the window size of the communication between the wireless terminal device 2 and the server device 4 (Step S102). The congestion detection unit 112 of the prediction unit 11 monitors occurrence of the congestion in the communication between the wireless terminal device 2 and the server device 4 (Step S103).

When the congestion occurs (Yes in Step S104), the threshold value calculation unit 114 of the prediction unit 11 calculates the threshold value used in the congestion control algorithm whose classification is determined by the algorithm determination unit 113 of the prediction unit 11 (Step S105), and the processing advances to Step S106. On the other hand, when the congestion does not occur (No in Step S104), the window size prediction unit 115 of the prediction unit 11 predicts the window size on the base of the measurement result on the window size provided by the window size measurement unit 111, the monitoring result on occurrence of the congestion provided by the congestion detection unit 112, and the classification of the congestion control algorithm determined by the algorithm determination unit 113 (Step S106).

The throughput prediction unit 116 of the prediction unit 11 predicts the throughput on the base of the window size predicted by the window size prediction unit 115 (Step S107). The allocation unit 12 allocates the wireless resources, which are used for the communication of the base station 1 with the wireless terminal device 2, on the base of the throughput predicted by the prediction unit 11 (Step S108), and the processing returns to Step S102.

Figure 8:
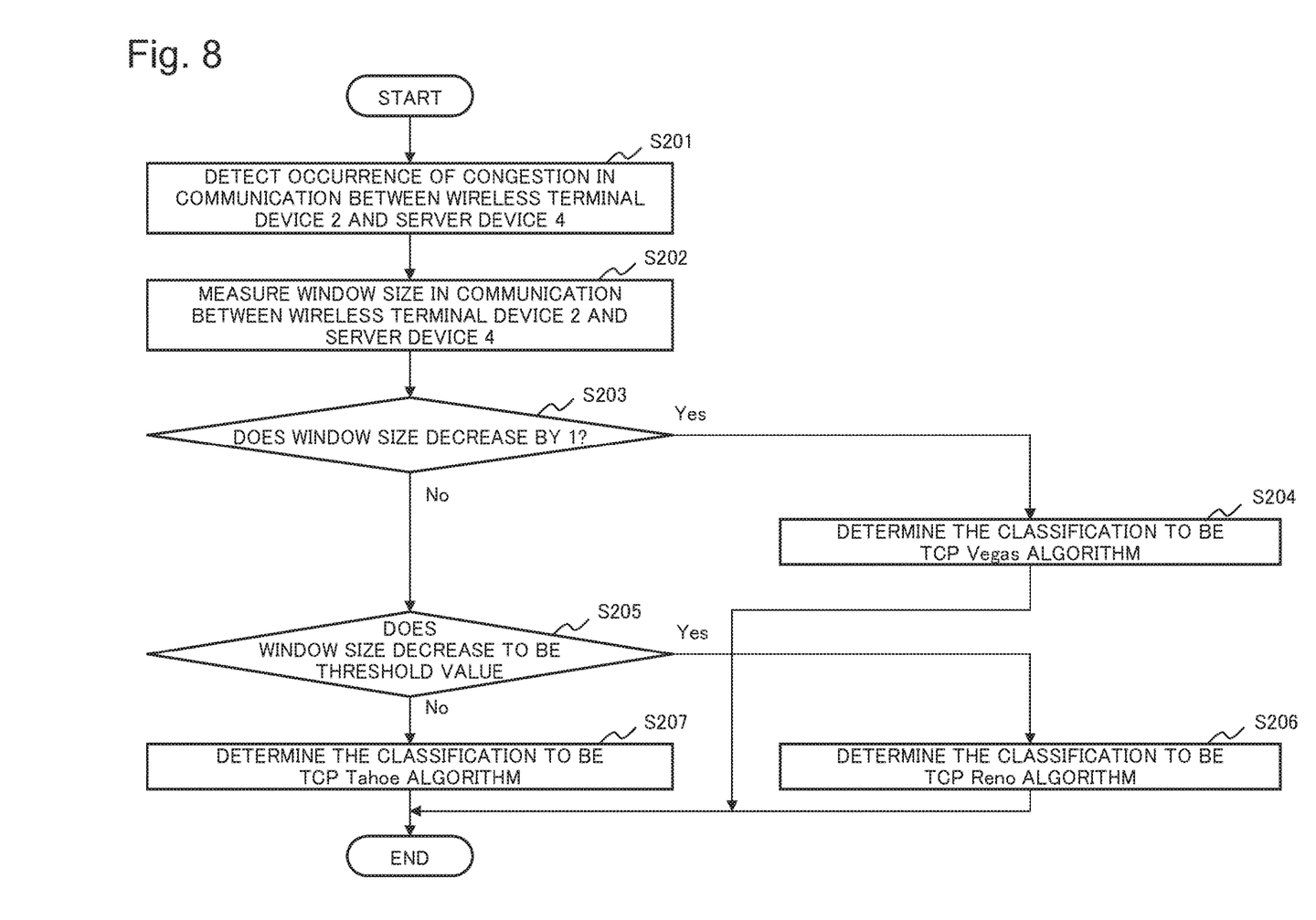
FIG. 8 is a flowchart illustrating an operation in which the wireless resource allocation device 10 according to the first example embodiment of the present invention determines a classification of the congestion control algorithm.

FIG. 8 is the flowchart illustrating an operation in which the wireless resource allocation device 10 determines the classification of the congestion control algorithm.

The congestion detection unit 112 of the prediction unit 11 detects occurrence of the congestion in the communication between the wireless terminal device 2 and the server device 4 (Step S201). The window size measurement unit 111 of the prediction unit 11 measures the window size in the communication between the wireless terminal device 2 and the server device 4 (Step S202).

When the window size decreases by one segment (Yes in Step S203), the algorithm determination unit 113 of the prediction unit 11 determines that the congestion control algorithm is the TCP Vegas algorithm (Step S204), and the whole processing is ended.

When the window size decreases to be the threshold value (No in Step S203, and Yes in Step S205), the algorithm determination unit 113 determines that the congestion control algorithm is the TCP Reno algorithm (Step S206), and the whole processing is ended.

When the window size does not decrease by one segment, and does not decrease to be the threshold value (that is, when the window size decreases to be one segment) (No in Step S203, and No in Step 205), the algorithm determination unit 113 determines that the congestion control algorithm is the TCP Tahoe algorithm (Step S207), and the whole processing is ended.

According to the wireless resource allocation device 10 of the present example embodiment, it is possible to improve efficiency in allocating the wireless resources. The reason is that the wireless resource allocation device 10 predicts the communication rate of the communication information, which is transmitted and received by the wireless terminal device 2, on the base that the communication-rate-control-information, which is included by the communication information, regularly changes, and allocates the wireless resources, which are used for the communication of the base station 1 with the wireless terminal device 2, on the base of the predicted communication rate. Here, the communication-rate-control-information is information, which is determined by the communication protocol, such as the window size or the like.

Hereinafter, an effect which is realized by the wireless resource allocation device 10 according to the present example embodiment will be explained in detail.

The communication protocol, which controls the wireless communication, may include the communication-rate-control-information in some cases. For example, the communication data, which are transmitted and received based on TCP, include the window size as the header information. According to TCP, in order to ensure reliability of communication, response confirmation, which is a response to packet transmission, is carried out. But, if the response confirmation is carried out every time the packet is transmitted, the communication rate decreases. Therefore, according to TCP, the window size, which indicates an amount of data transmitted once without receiving the ACK packet, is defined. The window size is dynamically and regularly changed according to predetermined algorithm by a device which communicates based on TCP.

The communication rate of the wireless communication is affected by information, which controls the communication rate, such as the window size, or the like. That is, it is possible to improve efficiency in allocating the wireless resources by predicting the communication rate with high level precision on the base that the information, which controls the communication rate, regularly changes, and allocating the wireless resources on the base of the predicted communication rate.

In order to realize the above-mentioned allocation of the wireless resources, the wireless resource allocation device 10 according to the present example embodiment includes the prediction unit 11 and the allocation unit 12. That is, the prediction unit 11 predicts the communication rate of the communication information on the base that the communication-rate-control-information, which is included by the communication information transmitted and received by the wireless terminal device 2 and which is determined by the communication protocol such as TCP or the like, regularly changes. Moreover, the allocation unit 12 allocates the wireless resources, which are used for the communication of the base station 1 with the wireless terminal device 2, on the base of the communication rate which is predicted by the prediction unit 11. Thereby, the wireless resource allocation device 10 according to the present example embodiment can improve efficiency in allocating the wireless resources in the wireless communication.

Moreover, the prediction unit 11 according to the present example embodiment determines the classification of the algorithm, with which the communication protocol such as TCP, or the like changes the window size, on the base of the change of the window size (communication-rate-control-information). Thereby, the wireless resource allocation device 10 according to the present example embodiment can precisely predict how the window size will change next. Accordingly, it is possible to further improve efficiency in allocating the wireless resources. Here, the prediction unit 11 may determine algorithm other than the above-mentioned three kinds of algorithm.

Moreover, it is possible to apply the wireless resource allocation device 10 according to the present example embodiment to various wireless communication systems such as LTE (Long Term Evolution), 5G (5th Generation), Wireless LAN (Local Area Network), inter-vehicle communication, satellite communication, and the like. Here, the wireless resource allocation device 10 can carry out the above-mentioned process also to wireless communication based on a communication protocol other than TCP/IP.

Second Example Embodiment

Figure 9:
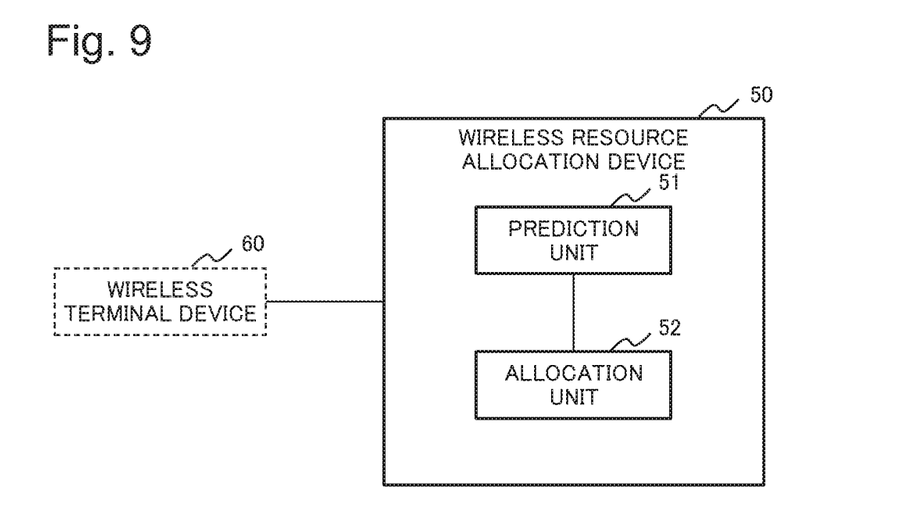
FIG. 9 is a block diagram illustrating a configuration of a wireless resource allocation device 50 according to a second example embodiment of the present invention.

FIG. 9 is a block diagram conceptually illustrating a configuration of a wireless resource allocation device 50 according to a second example embodiment of the present invention.

The wireless resource allocation device 50 according to the present example embodiment includes a prediction unit 51 and an allocation unit 52.

The prediction unit 51 predicts a communication rate of communication information, which is transmitted and received by a wireless terminal device 60, on the base that communication-rate-control-information, which is included by the communication information and which is determined by a communication protocol, regularly changes.

The allocation unit 52 allocates wireless resources, which are used for communication with the wireless terminal device 60, on the base of the communication rate predicted by the prediction unit 51.

According to the wireless resource allocation device 50 of the present example embodiment, it is possible to improve efficiency in allocating the wireless resources. The reason is that the wireless resource allocation device 50 predicts the communication rate of the communication information, which is transmitted and received by the wireless terminal device 60, on the base that the communication-rate-control-information, which is included by the communication information and which is determined by the communication protocol, regularly changes, and allocates the wireless resources, which are used for communicating with the wireless terminal device 60, on the base of the predicted communication rate.

[Example of Hardware Configuration]

Each unit of the wireless resource allocation devices 10 and 50 illustrated in FIG. 1 and FIG. 9 according to the first and the second example embodiments respectively is realized by using dedicated HW (HardWare) (electronic circuit). Each of, at least, the following components illustrated in FIG. 1 and FIG. 9 can be regarded as a function (processing) unit (software module) of a software program.

Prediction units 11 and 51
Allocation units 12 and 52,

However, division into the units which are illustrated in FIG. 1 and FIG. 9 is a configuration conceived for convenience of explanation, and various configurations can be assumed at a time of implementation. An example of a hardware environment in this case will be explained with reference to FIG. 10.

Figure 10:
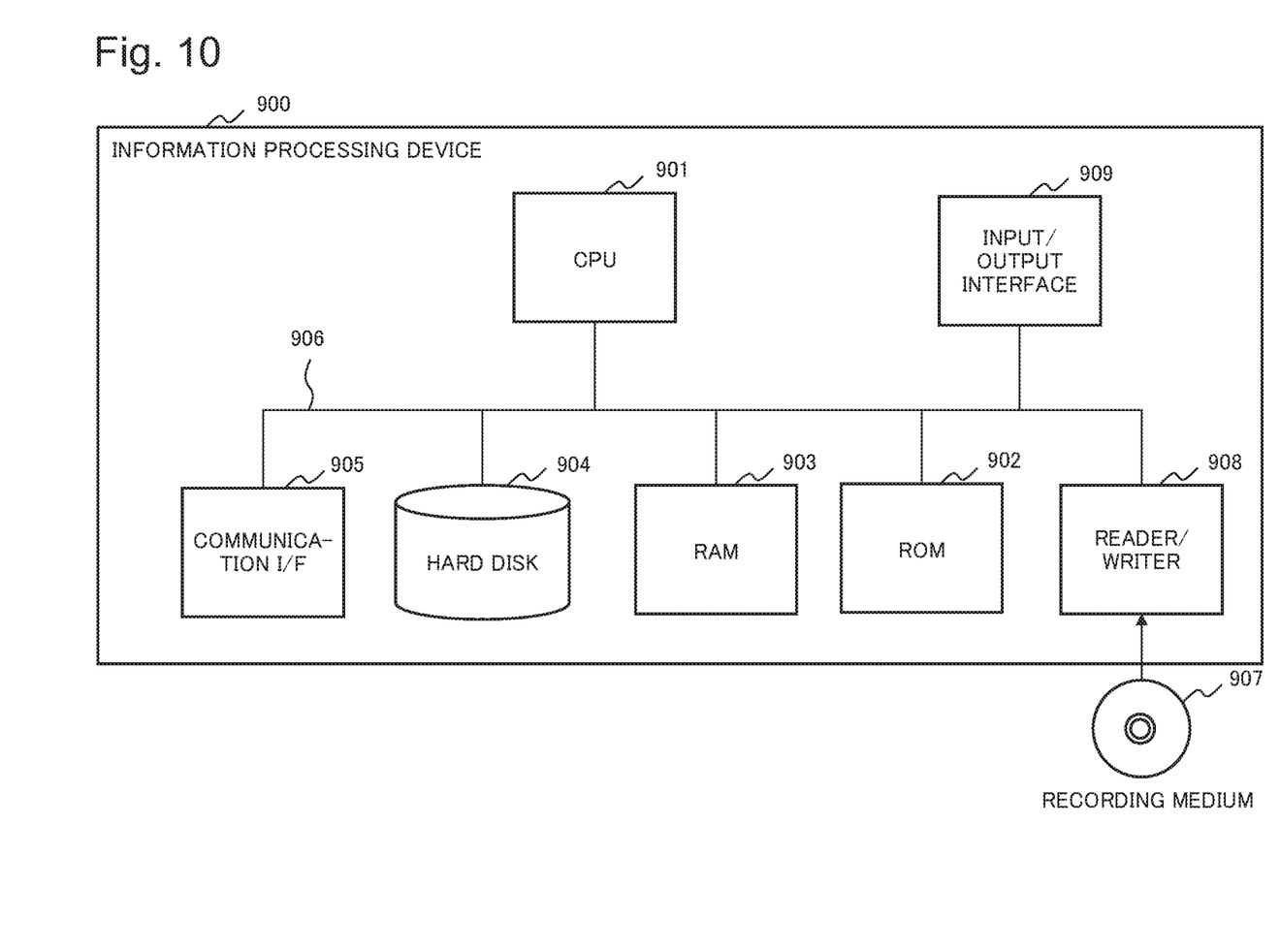
FIG. 10 is a block diagram illustrating a configuration of an information processing device 900 which can implement the wireless resource allocation device according to each example embodiment of the present invention.

FIG. 10 is a block diagram explaining a configuration of an information processing device 900, which can realize the wireless resource allocation device according to each example embodiment of the present invention, as an example. That is, FIG. 10 illustrates a configuration of a computer (information processing device) which can realize a whole of, or a part of the wireless resource allocation device illustrated in each of FIG. 1 and FIG. 9, and represents the hardware environment which can realize each function in the example embodiments mentioned above. The information processing device 900 illustrated in FIG. 10 includes the following components.

CPU (Central_Processing_Unit) 901
ROM (Read_Only_Memory) 902
RAM (Random_Access_Memory) 903
Hard disk (storage unit) 904
Communication interface 905 interfacing with the external device
Bus 906 (communication line)
Reader-writer 908 which can read data stored by a recording medium 907 such as CD-ROM (Compact_Disc_Read_Only_Memory) or the like, and can write data into the recording medium 907.
Input-output interface 909.

That is, the information processing device 900, which includes the above-mentioned components, is a general computer in which these components are connected each other through the bus 906. The information processing device 900 may include a plurality of the CPUs 901 in some cases, and may include the multi-core type CPU 901 in other cases.

Then, according to the present invention which has been explained by exemplifying the above-mentioned example embodiments, a computer program which can realize the following functions is supplied to the information processing device 900 illustrated in FIG. 10. The functions are functions of the above-mentioned components in the block diagrams (FIG. 1 and FIG. 9) which are referred to in the explanation of the example embodiments, or functions described in the flowcharts (FIG. 7 and FIG. 8) which are referred to in the explanation of the example embodiments. Afterward, the computer program is read and put into the hardware, that is, the CPU 901. Then, the CPU 901 interprets and executes the computer program. As a result, the present invention is achieved. Moreover, the computer program, which is supplied to the device, may be stored by a volatile memory (RAM 903) which is capable of reading and writing, or may be stored by a non-volatile storage device such as the ROM 902, the hard disk 904, or the like.

In the above-mentioned case, as a method for supplying the computer program to the hardware, a procedure which has been general at this time can be adopted. As the procedure, a method of installing the computer program into the device through the various recording media 907 such as CD-ROM, or the like, or a method of down loading the computer program from the outside through a communication line such as The Internet or the like. In this case, it is possible to grasp that the present invention is realized by codes which compose the computer program, or the recording medium 907 which stores the codes.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. Further, it is noted that the inventor's intent is to retain all equivalents of the claimed invention even when the claims are amended during prosecution.

The invention claimed is:

1. A wireless resource allocation device comprising:
   at least one processor; and
   a memory storing instructions that, when executed by the at least one processor, cause the at least one processor to:
   receive communication information, which is transmitted by a wireless terminal device;
   based on communication-rate-control information, which is included in the communication information and which is determined by a communication protocol, a monitoring result on occurrence of a congestion, and a classification of one of a plurality of algorithms, predict a window size;
   based on the predicted window size, predict a communication rate; and
   allocate wireless resources, which are used for communication with the wireless terminal device, based on the predicted communication rate,
   wherein the communication-rate-control information is regularly changed based on the one of the plurality of algorithms, the one of the plurality of algorithms being dynamically used by the wireless terminal device,
   wherein the at least one processor determines the one of the plurality of algorithms used by the communication protocol, based on a change of the communication-rate-control information.

2. The wireless resource allocation device according to claim 1, wherein the at least one processor predicts the communication rate based on a change of the window size which is determined by Transmission Control Protocol (TCP) as the communication-rate-control information.

3. The wireless resource allocation device according to claim 2, wherein the at least one processor:
   detects that a the congestion occurs in at least one of transmission or reception of the communication information, and
   when the congestion occurs, predicts the window size, which the TCP changes for the congestion, based on which one of the plurality of algorithms is used by the communication protocol.

4. The wireless resource allocation device according to claim 3, wherein when a situation of receiving a reply packet, which is a reply to a transmission packet representing the communication information transmitted by the wireless terminal device, satisfies a predetermined condition, the at least one processor detects that the congestion has occurred.

5. The wireless resource allocation device according to claim 3, wherein the at least one processor determines the classification of the one of the plurality of algorithms to be at least one of: a Tahoe algorithm, a Reno algorithm, or a Vegas algorithm.

6. The wireless resource allocation device according to claim 5, wherein
   when the window size decreases to one unit amount at a time of occurrence of the congestion occurring in the at least one of transmission or reception of the communication information, the at least one processor determines the classification to be the Tahoe algorithm,
   when the window size decreases to a threshold value at the time of occurrence of the congestion, the at least one processor determines the classification to be the Reno algorithm, and
   when the window size decreases by the one unit amount at the time of occurrence of the congestion, the at least one processor determines the classification to be the Vegas algorithm.

7. The wireless resource allocation device according to claim 1, wherein the wireless resource allocation device is included in a base station which controls a communication connection with the wireless terminal device.

8. A wireless resource allocation method for an information processing device, the wireless resource allocation method comprising:
   receiving communication information, which is transmitted by a wireless terminal device;
   based on communication-rate-control information, which is included in the communication information and which is determined by a communication protocol, a monitoring result on occurrence of a congestion, and a classification of one of a plurality of algorithms, predicting a window size;
   based on the predicted window size, predicting a communication rate; and
   allocating wireless resources, which are used for communication with the wireless terminal device, based on the predicted communication rate, wherein the communication-rate-control information is regularly changed based on the one of the plurality of algorithms, the one of the plurality of algorithms being dynamically used by the wireless terminal device,
   wherein the method further comprises determining the one of the plurality of algorithms used by the communication protocol, based on a change of the communication-rate-control information, when predicting the communication rate.

9. A non-transitory computer readable recording medium which stores a wireless resource allocation program including instructions that, when executed by a computer, cause the computer to:
   receive communication information, which is transmitted by a wireless terminal device;
   based on communication-rate-control information, which is included in the communication information and which is determined by a communication protocol, a monitoring result on occurrence of a congestion, and a classification of one of a plurality of algorithms, predict a window size;
   based on the predicted window size, predict a communication rate; and
   allocate wireless resources, which are used for communication with the wireless terminal device, based on the predicted communication rate, wherein the communication-rate-control information is regularly changed based on the one of the plurality of algorithms, the one of the plurality of algorithms being dynamically used by the wireless terminal device, wherein the computer further determines the one of the plurality of algorithms used by the communication protocol, based on a change of the communication-rate-control information, when predicting the communication rate.

\* \* \* \* \*